US008345920B2

(12) United States Patent
Ferren et al.

(10) Patent No.: US 8,345,920 B2
(45) Date of Patent: *Jan. 1, 2013

(54) GESTURE RECOGNITION INTERFACE SYSTEM WITH A LIGHT-DIFFUSIVE SCREEN

(75) Inventors: Bran Ferren, Beverly Hills, CA (US); H. Keith Nishihara, Los Altos, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 1082 days.

This patent is subject to a terminal disclaimer.

(21) Appl. No.: 12/143,529

(22) Filed: Jun. 20, 2008

(65) Prior Publication Data

US 2009/0316952 A1 Dec. 24, 2009

(51) Int. Cl.
*G06K 9/00* (2006.01)
(52) U.S. Cl. ........................................................ 382/103
(58) Field of Classification Search .................. 382/100, 382/103; 715/863
See application file for complete search history.

(56) References Cited

U.S. PATENT DOCUMENTS

| | | | | |
|---|---|---|---|---|
| 4,468,694 A | * | 8/1984 | Edgar | 348/135 |
| 4,843,568 A | | 6/1989 | Krueger et al. | |
| 4,924,506 A | | 5/1990 | Crossley et al. | |
| 5,220,441 A | | 6/1993 | Gerstenberger | |
| 5,239,373 A | * | 8/1993 | Tang et al. | 348/14.01 |
| 5,400,069 A | * | 3/1995 | Braun et al. | 348/14.16 |
| 5,475,422 A | | 12/1995 | Mori et al. | |
| 5,483,261 A | | 1/1996 | Yasutake | |
| 5,563,988 A | | 10/1996 | Maes et al. | |
| 5,913,727 A | | 6/1999 | Ahdoot | |
| 5,999,185 A | | 12/1999 | Kato et al. | |
| 6,002,808 A | | 12/1999 | Freeman | |
| 6,061,177 A | * | 5/2000 | Fujimoto | 359/443 |
| 6,128,003 A | | 10/2000 | Smith et al. | |
| 6,147,678 A | | 11/2000 | Kumar et al. | |
| 6,195,104 B1 | | 2/2001 | Lyons | |

(Continued)

FOREIGN PATENT DOCUMENTS

DE 197 39 285 C 1 11/1998

(Continued)

OTHER PUBLICATIONS

British Search Report for corresponding GB0910067.8, completed Oct. 15, 2009.

(Continued)

*Primary Examiner* — Brian P Werner
*Assistant Examiner* — Shefali Goradia
(74) *Attorney, Agent, or Firm* — Tarolli, Sundheim, Covell & Tummino LLP (57) ABSTRACT

One embodiment of the invention includes a gesture recognition interface system. The interface system may comprise at least one light source positioned to illuminate a first side of a light-diffusive screen. The interface system may also comprise at least one camera positioned on a second side of the light-diffusive screen, the second side being opposite the first side, and configured to receive a plurality of images based on a brightness contrast difference between the light-diffusive screen and an input object. The interface system may further comprise a controller configured to determine a given input gesture based on changes in relative locations of the input object in the plurality of images. The controller may further be configured to initiate a device input associated with the given input gesture.

17 Claims, 4 Drawing Sheets

U.S. PATENT DOCUMENTS

| | | | |
|---|---|---|---|
| 6,204,852 B1 | 3/2001 | Kumar et al. | |
| 6,222,465 B1 | 4/2001 | Kumar et al. | |
| 6,327,381 B1 | 12/2001 | Rogina et al. | |
| 6,353,428 B1 | 3/2002 | Maggioni et al. | |
| 6,359,612 B1 | 3/2002 | Peter et al. | |
| 6,434,255 B1 | 8/2002 | Harakawa | |
| 6,512,507 B1 | 1/2003 | Furihata et al. | |
| 6,624,833 B1 | 9/2003 | Kumar et al. | |
| 6,681,031 B2 | 1/2004 | Cohen et al. | |
| 6,695,770 B1 | 2/2004 | Choy et al. | |
| 6,714,901 B1 | 3/2004 | Cotin et al. | |
| 6,720,949 B1 | 4/2004 | Pryor et al. | |
| 6,788,809 B1 | 9/2004 | Grzeszczuk et al. | |
| 6,796,656 B1 | 9/2004 | Dadourian | |
| 6,806,849 B2 | 10/2004 | Sullivan | |
| 6,857,746 B2 | 2/2005 | Dyner | |
| 6,950,534 B2 | 9/2005 | Cohen et al. | |
| 6,956,573 B1 | 10/2005 | Bergen et al. | |
| 6,983,065 B1 | 1/2006 | Akgul et al. | |
| 7,042,440 B2 | 5/2006 | Pryor et al. | |
| 7,129,927 B2 | 10/2006 | Mattsson | |
| 7,259,747 B2 | 8/2007 | Bell | |
| 7,365,838 B2* | 4/2008 | Jones | 356/239.1 |
| 7,408,707 B2* | 8/2008 | Yeo et al. | 359/452 |
| 7,701,439 B2 | 4/2010 | Hillis et al. | |
| 7,834,846 B1* | 11/2010 | Bell | 345/156 |
| 8,007,110 B2* | 8/2011 | Dunn et al. | 353/28 |
| 8,055,022 B2* | 11/2011 | Morrison et al. | 382/103 |
| 2001/0006426 A1 | 7/2001 | Son et al. | |
| 2001/0043719 A1 | 11/2001 | Harakawa et al. | |
| 2002/0090146 A1 | 7/2002 | Heger et al. | |
| 2002/0093666 A1* | 7/2002 | Foote et al. | 356/621 |
| 2002/0122113 A1 | 9/2002 | Foote | |
| 2002/0126161 A1* | 9/2002 | Kuzunuki et al. | 345/863 |
| 2002/0186221 A1 | 12/2002 | Bell | |
| 2003/0058341 A1 | 3/2003 | Brodsky et al. | |
| 2003/0067537 A1 | 4/2003 | Myers | |
| 2003/0085866 A1 | 5/2003 | Bimber et al. | |
| 2003/0156756 A1 | 8/2003 | Gokturk et al. | |
| 2003/0218761 A1 | 11/2003 | Tomasi et al. | |
| 2004/0046747 A1 | 3/2004 | Bustamante | |
| 2004/0108990 A1 | 6/2004 | Lieberman et al. | |
| 2004/0113885 A1 | 6/2004 | Genc et al. | |
| 2004/0125207 A1 | 7/2004 | Mittal et al. | |
| 2004/0183775 A1 | 9/2004 | Bell | |
| 2004/0193413 A1 | 9/2004 | Wilson et al. | |
| 2004/0239761 A1 | 12/2004 | Jin et al. | |
| 2005/0002074 A1 | 1/2005 | McPheters et al. | |
| 2005/0012185 A1 | 1/2005 | Hampapur et al. | |
| 2005/0052714 A1 | 3/2005 | Klug et al. | |
| 2005/0068537 A1 | 3/2005 | Han et al. | |
| 2005/0088714 A1 | 4/2005 | Kremen | |
| 2005/0110964 A1 | 5/2005 | Bell et al. | |
| 2005/0151850 A1 | 7/2005 | Ahn et al. | |
| 2005/0166163 A1 | 7/2005 | Chang et al. | |
| 2005/0275628 A1 | 12/2005 | Balakrishnan et al. | |
| 2005/0285945 A1 | 12/2005 | Usui et al. | |
| 2005/0286101 A1 | 12/2005 | Garner et al. | |
| 2006/0010400 A1 | 1/2006 | Dehlin et al. | |
| 2006/0036944 A1 | 2/2006 | Wilson | |
| 2006/0052953 A1 | 3/2006 | Vilanova et al. | |
| 2006/0092178 A1 | 5/2006 | Tanguay | |
| 2006/0125799 A1 | 6/2006 | Hillis et al. | |
| 2006/0187196 A1 | 8/2006 | Underkoffler et al. | |
| 2006/0203363 A1 | 9/2006 | Levy-Rosenthal | |
| 2006/0209021 A1 | 9/2006 | Yoo et al. | |
| 2007/0024590 A1 | 2/2007 | Krepec | |
| 2007/0064092 A1 | 3/2007 | Sandbeg et al. | |
| 2008/0013826 A1* | 1/2008 | Hillis et al. | 382/154 |
| 2008/0028325 A1* | 1/2008 | Ferren et al. | 715/753 |
| 2008/0043106 A1 | 2/2008 | Hassapis et al. | |
| 2008/0150913 A1 | 6/2008 | Bell et al. | |
| 2008/0244468 A1 | 10/2008 | Nishihara et al. | |
| 2009/0015791 A1 | 1/2009 | Chang et al. | |
| 2009/0103780 A1 | 4/2009 | Nishihara et al. | |
| 2009/0115721 A1 | 5/2009 | Aull et al. | |
| 2009/0116742 A1 | 5/2009 | Nishihara | |
| 2010/0050133 A1 | 2/2010 | Nishihara et al. | |

FOREIGN PATENT DOCUMENTS

| | | |
|---|---|---|
| EP | 0 571 702 A2 | 12/1993 |
| EP | 0 571 702 A3 | 12/1993 |
| EP | 0 913 790 A1 | 5/1999 |
| EP | 1 223 537 A2 | 12/2001 |
| EP | 1 689 172 A1 | 8/2006 |
| EP | 1 879 129 A1 | 1/2008 |
| EP | 1 879 130 A2 | 1/2008 |
| EP | 2 056 185 A2 | 5/2009 |
| EP | 2 068 230 A2 | 6/2009 |
| GB | 2460937 A | 12/2009 |
| JP | 62264390 A | 1/1987 |
| JP | 4271423 A | 2/1991 |
| JP | 04031996 A | 2/1992 |
| WO | WO 98/13746 | 4/1998 |
| WO | WO 00/02187 A1 | 1/2000 |
| WO | WO 00/21023 A1 | 4/2000 |
| WO | WO 00/55802 A | 9/2000 |
| WO | WO 03/026299 A1 | 3/2003 |
| WO | WO 2008/001202 A3 | 1/2008 |

OTHER PUBLICATIONS

Bretzner, et al.: "Hand Gesture Recognition Using Multi-Scale Colour Features, Hierarchical Models and Particle Filtering"; Automatic Face and Gesture Recognition, 2002, Proceedings. Fifth IEEE International Conference on, IEEE, Piscataway, NJ, USA, May 20, 2002, pp. 423-428, XP010949393, ISBN: 978-0-7695-1602-8, p. 2.
British Search Report for corresponding GB 0909597.7 completed Sep. 17, 2009.
DE Office Action for corresponding DE 10 2009 043 798.3, issued Nov. 10, 2010.
Dubois, et al.: "In Vivo Measurement of Surgical Gestures"; IEEE Transactions on Biochemical Engineering, vol. 49, No. 1, Jan. 2002, pp. 49-54.
EP Search Report for corresponding EP 07 25 2716, completed Jun. 4, 2010, The Hague.
EP Search Report for corresponding EP 07 25 2870 completed Aug. 16, 2010 by Suphi Umut Naci of the Hague.
European Search Report for corresponding EP 07 25 2717 completed Sep. 27, 2007 by Martin Müller of the EPO.
Fiorentino, et al.: "Spacedesign: A Mixed Reality Workspace for Aesthetic Industrial Design"; Mixed and Augmented Reality, 2002. ISMAR 2002. Proceedings. International Symposium on Sep. 30-Oct. 1, 2002, Piscataway, NJ, USA, IEEE, Sep. 30, 2002, pp. 86-318, XP010620945, ISBN: 0-7695-1781-1; Abstract, Figs. 1, 2; p. 86, left-hand col., ¶4; p. 87, left-hand col., ¶4-right-hand col.
German Office Action for corresponding DE 10 2009 034 413.6-53, issued Sep. 29, 2010.
Hartley, et al.: "Multiple View Geometry in Computer Vision, Structure Computation"; Jul. 31, 2000, Multiple View Geometry in Computer Vision, Cambridge University Press, GB, pp. 295-311, XP002521742, ISBN: 9780521623049, pp. 295-311, figures 11.1, 11.2 & 11.7.
Ishibuci, et al.: "Real Time Hand Gesture Recognition Using 3D Prediction Model"; Proceedings of the International Conference on Systems, Man and Cybernetics. Le Touquet, Oct. 17-20, 1993; New York, IEEE, US LNKD-DOI: 10.1109/ICSMC.1993.390870, vol. -, Oct. 17, 1993, pp. 324-328, XP010132504, ISBN: 978-0-7803-0911-1, pp. 325; figures 1-4.
Kjeldsen, et al.: "Toward the Use of Gesture in Traditional User Interfaces"; Automatic Face and Gesture Recognition, 1996, Proceedings of the Second International Conference on Killington, VT, USA 14-16 19961014' Los Alamitos, CA, USA, IEEE Comput. Soc., ISBN 978-0-8186-7713-7; whole document.
Korida, K et al: "An Interactive 3D Interface for a Virtual Ceramic Art Work Environment"; Virtual Systems and Multimedia, 1997. VSMM '97. Proceedings., International Conference on Geneva, Switzerland Sep. 10-12, 1997, Los Alamitos, CA, USA, IEEE Comput. Soc, US, Sep. 10, 1997, pp. 227-234, XP010245649, ISBN: 0-8186-8150-0; Abstract, Figs. 1, 2, 5, 7-11.
Leibe, et al.: "Toward Spontaneous Interaction with the Perceptive Workbench"; IEEE Computer Graphics and Applications; p. 54-65XP-000969594; Nov./Dec. 2000.

Mitchell: "Virtual Mouse"; IP.COM Inc, West Henrietta, NY, US, May 1, 1992 ISSN 1533-0001; whole document.

Office Action for corresponding DE 10 2009 025 236.3, issued May 2010.

Pajares, et al.: "Usability Analysis of a Pointing Gesture Interface"; Systems, Man and Cybernetic, 2004 IEEE International Conference on , Oct. 10, 2004, ISBN 978-0-7803-8566-5; see e.g. sections 2.1 and 4.

Pavlovic, et al.: "Visual Interpretation of Hand Gestures for Human-Computer Interaction: A Review"; Jul. 1, 1997, IEEE Transactions on Pattern Analysis and Machine Intelligence, IEEE Service Center, Los Alamitos, CA, US LNKD-DOI: 10.1109/34.598226, pp. 677-695, XP000698168, ISSN: 0162-8828, pp. 14-16, figure 5.

Plesniak, W et al.: "Spatial Interaction with Haptic Holograms"; Multimedia Computing and Systems, 1999, IEEE International Conference on Florence, Italy Jun. 7-11, 1999, Los Alamitos, CA USA, IEEE Comput. Soc. US, vol. 1, Jun. 7, 1999, pp. 413-426, XP010342817 ISBN: 0-7695-0253-9; Abstract, Figs. 7, 8.

Rehg: "visual Analysis of High DOF Articulated Objects with Application to Hand Tracking"; [online] 1995, XP002585209, School of Computer Science Carnegie Mellon University, Retrieved from the internet: URL: http//www.dtoc/,o;/cgi-bin/GetTRDoc?AD=ADA306677&Location=U2&doc=GetRDoc.pdf> [retrieved on May 25, 2010], p. 1, 28, 31.

Sato, Y et al.: "Real-Time Input of 3D Pose and Gestures of a Users Hand and its Applications for HCI"; Proceedings IEEE 2001 virtual Reality. (VR). Yokohama, Japan, Mar. 13, 2001, pp. 79-86, XP010535487; ISBN: 0-7695-0948-7; Abstract, Figs. 3, 4, 6, 8.

Search Report for corresponding British application No. GB0917797.3; completed Jan. 28, 2010 by Mr. Jeremy Cowen.

Search Report for corresponding GB 0715481.8, Date of Search: Nov. 27, 2007.

Search Report for corresponding GB 0913330.7; Completed Nov. 3, 2009 by Dr. Russell Maurice.

Sonka, et al.: "Image Processing, Analysis, and Machine Vision Second Edition"; Sep. 30, 1998, Thomson, XP002585208, ISBN: 053495393X, p. v-xii, p. 82-89.

Sutcliffe, et al.: "Presence, Memory and Interaction in Virtual Environments"; International Journal of Human-Computer Studies, 62 (2005), pp. 307-327.

Vámossy, et al.: "Virtual Hand—Hand Gesture Recognition System"; SISY 2007, 5th International Symposium on Intelligent Systems and Informatics, Aug. 24-25, 2007, Subolica, Serbia, IEEE, p. 97-102.

* cited by examiner

GESTURE RECOGNITION INTERFACE SYSTEM WITH A LIGHT-DIFFUSIVE SCREEN

TECHNICAL FIELD

The present invention relates generally to interface systems, and specifically to a gesture recognition interface system with a light-diffusive screen.

BACKGROUND

As the range of activities accomplished with a computer increases, new and innovative ways to provide an interface with a computer are often developed to complement the changes in computer functionality and packaging. For example, touch sensitive screens can allow a user to provide inputs to a computer without a mouse and/or a keyboard, such that desk area is not needed to operate the computer. Examples of touch sensitive screens include pressure sensitive membranes, beam break techniques with circumferential light sources and sensors, and acoustic ranging techniques. However, these types of computer interfaces can only provide information to the computer regarding the touch event, itself, and thus can be limited in application. In addition, such types of interfaces can be limited in the number of touch events that can be handled over a given amount of time, and can be prone to interpret unintended contacts, such as from a shirt cuff or palm, as touch events. Furthermore, touch sensitive screens can be prohibitively expensive and impractical for very large display sizes, such as those used for presentations.

SUMMARY

One embodiment of the invention includes a gesture recognition interface system. The interface system may comprise at least one light source positioned to illuminate a first side of a light-diffusive screen. The interface system may also comprise at least one camera positioned on a second side of the light-diffusive screen, the second side being opposite the first side, and configured to receive a plurality of images based on a brightness contrast difference between the light-diffusive screen and an input object. The interface system may further comprise a controller configured to determine a given input gesture based on changes in relative locations of the input object in the plurality of images. The controller may further be configured to initiate a device input associated with the given input gesture.

Another embodiment of the invention includes a method for providing device inputs. The method comprises illuminating a first side of a light-diffusive screen with at least one light source and providing simulated inputs in a foreground of a second side of the light-diffusive screen via gestures associated with an input object. The second side can be opposite the first side of the light-diffusive screen. The method also comprises generating a first plurality of images and a second plurality of images associated with the input object substantially concurrently based on a brightness contrast between the input object and the second side of the light-diffusive screen. The method also comprises determining a plurality of three-dimensional physical locations of the input object based on a relative separation of the input object in the first plurality of images relative to the second plurality of images. The method also comprises determining if changes in the plurality of three-dimensional physical locations of the input object correspond to any of a plurality of predefined gestures. The method further comprises providing at least one device input based on a given one of the plurality of predefined gestures upon determining that the changes in the plurality of three-dimensional physical locations of the input object correspond to the given one of the plurality of predefined gestures.

Another embodiment of the invention includes a gesture recognition interface system. The system comprises means for substantially diffusing infrared (IR) illumination provided from at least one light source and means for generating a first plurality of silhouette images and a second plurality of silhouette images of the input object relative to the diffused illumination. The first and second plurality of images can form a plurality of matched pairs of silhouette images of the input object. The system also comprises means for generating two-dimensional location information associated with at least one feature of the input object for each of the first plurality of images and the second plurality of images. The system also comprises means for interpolating three-dimensional location information associated with the input object based on the two-dimensional location information associated with the at least one feature of the input object for each of the plurality of matched pairs of images of the input object. The system further comprises means for translating changes in the three-dimensional location information associated with at least one feature of the input object to a given input gesture and means for providing device inputs based on matching the given input gesture with one of a plurality of predefined gestures.

DETAILED DESCRIPTION

The present invention relates generally to interface systems, and specifically to a gesture recognition interface system with a light-diffusive screen. A user employs an input object to provide simulated inputs to a computer or other electronic device. It is to be understood that the simulated inputs are provided by gestures using the input object. For example, the user could provide gestures that include motion and/or contact with a light-diffusive screen 20 using the input object. The input object could be, for example, the user's hand; a wand, stylus, pointing stick; or a variety of other devices with which the user can gesture. The simulated inputs could be, for example, simulated mouse inputs. At least one infrared (IR) light source illuminates a rear-side of a light-diffusive screen. As such, silhouette images of the input object can be generated based on a brightness contrast between the input object and IR illumination that is diffused through the light-diffusive screen. The silhouette images of the input object could be, for example, a plurality of matched pairs of images of the input object, such that each image of the matched pair corresponds to the input object from a different perspective at substantially the same time. A given matched pair of images can be employed to determine a location of the input object and the plurality of matched pairs of images can be employed to determine physical motion of the input object.

A controller can be configured to receive the plurality of images to determine three-dimensional location information associated with the input object. For example, the controller could apply an algorithm to determine the location of one or more features of the input object, such as the user's fingertips, in three-dimensional space. The controller could then translate the simulated inputs into device inputs based on the three-dimensional location information. For example, the controller could interpret gesture inputs based on motion associated with the one or more features of the input object and translate the gesture inputs into inputs to a computer or other device. The controller could also compare the motion associated with the one or more features of the input object with a plurality of predefined gestures stored in a memory, such that a match with a given predefined gesture could correspond with a particular device input.

Figure 1:
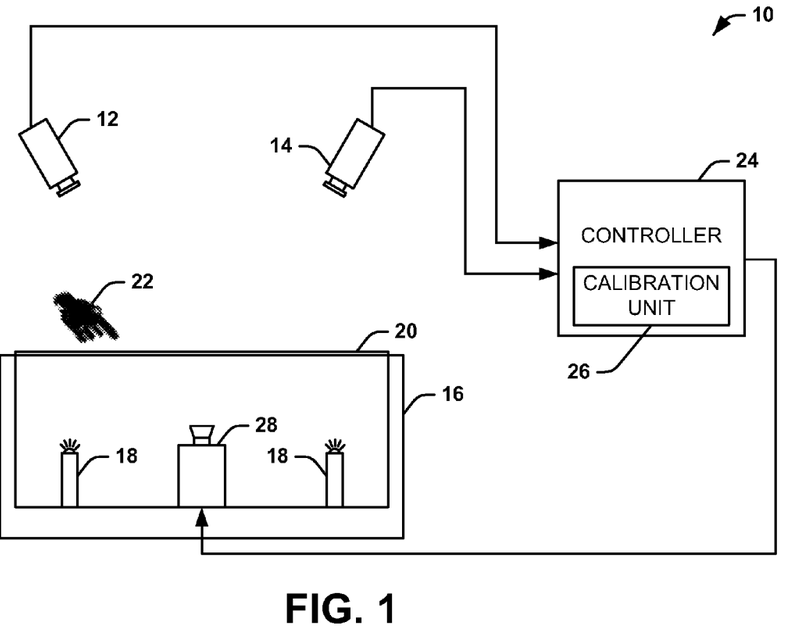
FIG. 1 illustrates an example of a gesture recognition interface system in accordance with an aspect of the invention.

FIG. 1 illustrates an example of a gesture recognition interface system 10 in accordance with an aspect of the invention. The gesture recognition interface system 10 includes a first camera 12 and a second camera 14. The first camera 12 and the second camera 14 may each include an infrared (IR) filter, such that the respective camera may only be able to receive IR light. The gesture recognition interface system 10 also includes a gesture table 16. As demonstrated in the example of FIG. 1, the gesture table 16 includes IR light sources 18 that each illuminate an underside of a light-diffusive screen 20. The light-diffusive screen 20 can be any of a variety of broadband diffuse materials. As such, IR light from the IR light sources 18 is diffused through the light-diffusive screen 20 at the top-surface of the light-diffusive screen 20. Accordingly, an object that is placed above the light-diffusive screen 20 may appear to each of the first camera 12 and the second camera 14 as a silhouette image, such that it can appear as a substantially darker object in the foreground of an IR emitting light-diffusive screen 20.

An input object 22 can provide simulated inputs over the light-diffusive screen 20. In the example of FIG. 1, the input object 22 is demonstrated as a user's hand, such that the simulated inputs can be provided through hand gestures. It is to be understood that the use of a hand to provide simulated inputs via hand gestures is but one example implementation of the gesture recognition interface system 10. Examples of other types of input objects could include a stylus, wand, pointing stick, or any of a variety of devices that could provide gestures to simulate inputs. It is to be further understood that the input object need not be specially designed or suited for use in the gesture recognition interface system 10.

In the example of FIG. 1, the first camera 12 and the second camera 14 each receive separate silhouette images of the input object 22, where each of the separate silhouette images received, respectively, by the first camera 12 and the second camera 14 are a matched pair. For example, each of the first camera 12 and the second camera 14 could rapidly take still photograph images at, for example, sixty times per second, such that each still photograph image taken by the first camera 12 is matched to a still photograph image taken by the second camera 14 at substantially the same time. The input object 22 can appear to be in a different location relative to the light-diffusive screen 20 in each silhouette image matched pair captured by each of the first camera 12 and the second camera 14, respectively, due to parallax caused by the different mounted locations of each of the first camera 12 and the second camera 14.

Based on the diffusive property of the light-diffusive screen 20, the IR illumination that is provided from the IR light sources 18 is emitted from the top-surface of the light-diffusive screen 20 in a substantially more uniform manner. In other words, the IR illumination that is provided from the IR light sources 18 is more evenly distributed as it is emitted from the top-surface of the light-diffusive screen 20. As a result, the input object 22 can be accurately detected in the images that are received by the cameras 12 and 14 regardless of the location of the input object 22 over the light-diffusive screen 20. Furthermore, as opposed to the use of overhead illumination, the use of the IR illuminators 18 beneath the light-diffusive screen 20 mitigates the appearance of residual shadows that are cast on the top-surface of the light-diffusive screen 20. Accordingly, outlines and features of the input object 22 over the light-diffusive screen 20, and thus the resultant gestures, can be accurately determined in the gesture recognition interface system 10.

The first camera 12 and the second camera 14 can each provide their respective separate silhouette images of the input object 22 to a controller 24. The controller 24 could reside, for example, within a computer (not shown) for which the gesture recognition interface system 10 is designed to provide a gesture recognition interface. It is to be understood, however, that the hosting of a controller is not limited to a standalone computer, but could be included in embedded processors. The controller 24 can process the respective silhouette images associated with the input object 22 to generate three-dimensional location data associated with the input object 22.

As an example, each of the first camera 12 and the second camera 14 could be mounted at a predetermined angle relative to the light-diffusive screen 20. For a given matched pair of images of the input object 22, if the predetermined angle of each of the cameras 12 and 14 is equal, then each point of the input object 22 in two-dimensional space in a given image from the camera 12 is equidistant from a corresponding point of the input object 22 in the respective matched image from the camera 14. As such, the controller 24 could determine the three-dimensional physical location of the input object 22 based on a relative parallax separation of the matched pair of images of the input object 22 at a given time. In addition, using a computer algorithm, the controller 24 could also determine the three-dimensional physical location of features associated with the input object 22, such as the inclination and orientation of fingers and/or the location of fingertips.

Furthermore, the controller 24 can include a calibration unit 26 that is configured to calibrate the gesture recognition interface system 10. The calibration unit 26 can implement a calibration routine, such as interacting with software of the controller 24, at power-up or setup of the gesture recognition interface system 10, or at periodic intervals. As an example, a calibration routine can be merely a prompt for a user to touch specific points that have predetermined locations on the light-diffusive screen 20 with an end-point of the input object 22. The calibration unit 26 could be a separate system working in conjunction with the controller 24, or could merely be a software routine residing within the controller 24.

The gesture table 16 also includes a projector 28 configured to project visual content onto the underside of the light-diffusive screen 20. The visual content can include an output interface, such as, for example, computer monitor data, with which the user can interact and provide inputs. Because the IR light sources 18 do not illuminate visible light, the IR illumination does not interfere with the visual content projected from the projector 28. The user can thus employ the input object 22 directly onto the monitor data to simulate inputs, such as, for example, mouse inputs. As an example, the controller 24 could interpret two-dimensional motion of an end-point of the input object 22 across the light-diffusive screen 20 as a mouse cursor, which can be projected as part of the monitor data by the projector 28. Furthermore, as another example, by determining the three-dimensional physical location of the end-point of the input object 22, the controller 24 could interpret a touch of the light-diffusive screen 20 by the end-point of the input object 22 as a left mouse-click. Accordingly, a user of the gesture recognition interface system 10 could navigate through a number of computer menus associated with a computer merely by moving his or her fingertip through the air above the light-diffusive screen 20 and by touching icons projected onto the light-diffusive screen 20.

As will be apparent in the following discussion, the gesture recognition interface system 10 in the example of FIG. 1 is intended to represent but one example of a gesture recognition interface system. For example, the gesture recognition interface system 10 demonstrates two IR light sources 18. However, it is to be understood that any number of IR light sources 18 can be implemented, and in any position beneath the light-diffusive screen 20. In addition, the IR light can be provided from another source other than the IR light sources 18. As an example, in addition to projecting the visual content, the projector 28 can be configured to emit IR light, such as based on removing an IR filter associated with the projector 28. As a result, the projector 28 can function both to project the visual content and to provide the IR illumination to the underside of the light-diffusive screen 20.

As another example, the gesture recognition interface system 10 could include more than two cameras that each supply respective silhouette images of the input object 22 to the controller 24. For example, the gesture recognition interface system 10 could include multiple pairs of cameras that each generate matched images of different areas of the light-diffusive screen 20. In addition, the example of FIG. 1 demonstrates that the projector 28 projects the visual content to the underside of the light-diffusive screen 20, such that the visual content is displayed as a rear-projection. However, it is to be understood that the projector 28 can be configured to project the visual content from above the light-diffusive screen 20, such as centered between the cameras 12 and 14. As yet another example, the IR light sources 18 may not illuminate in the IR spectrum, but could instead illuminate in a different spectrum, such as narrow frequency bands of visible light, with each of the respective cameras 12 and 14 having a corresponding spectrum filter. Furthermore, it is to be understood that the light-diffusive screen 20 need not be horizontal, but that the gesture table 16 can be configured such that the light-diffusive screen 20 could be oriented at a tilted angle (e.g., approximately 45°) for ergonomic and/or presentation purposes. Accordingly, the gesture recognition interface system 10 can be configured in any of a variety of ways.

Figure 2:
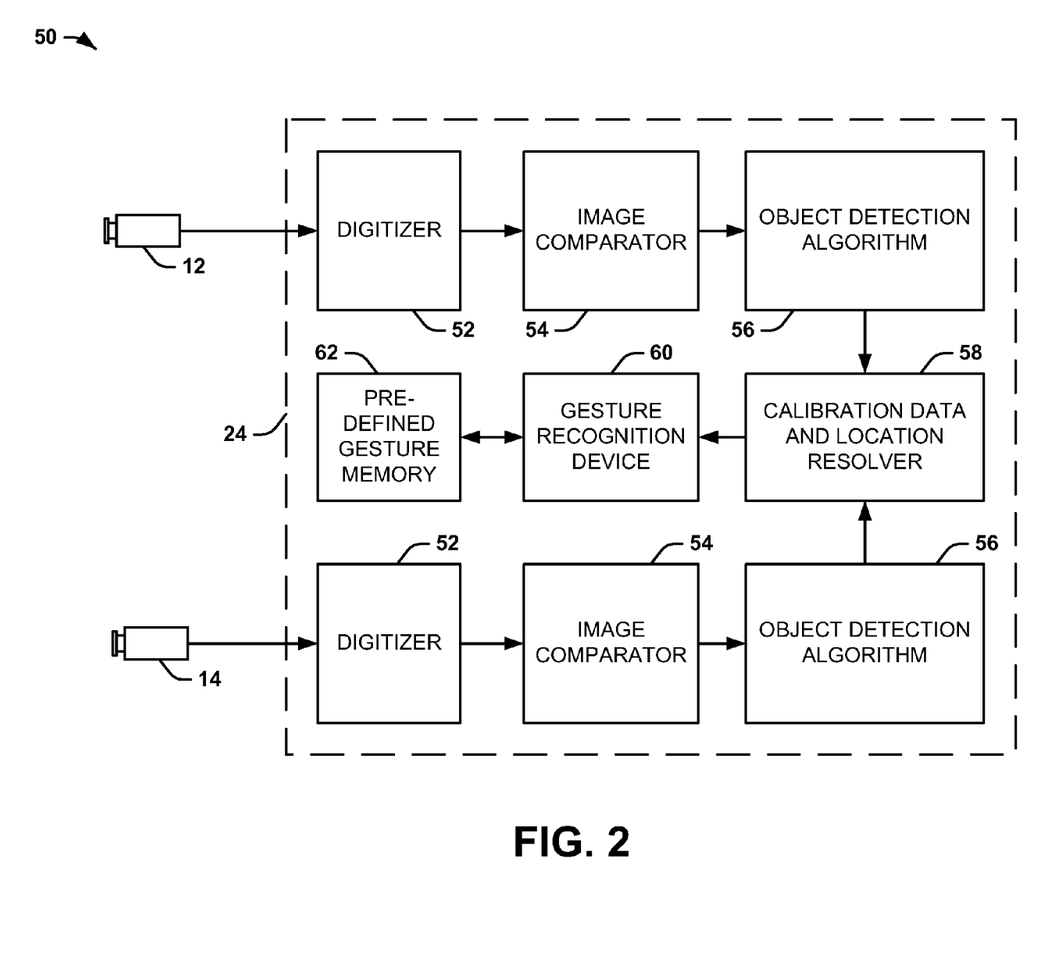
FIG. 2 illustrates another example of a gesture recognition interface system in accordance with an aspect of the invention.

FIG. 2 illustrates another example of a gesture recognition interface system 50 in accordance with an aspect of the invention. The gesture recognition interface system 50 can be a portion of the gesture recognition interface system 10 in the example of FIG. 1. As such, reference is to be made to the example of FIG. 1 in the following discussion of the example of FIG. 2.

The gesture recognition interface system 50 includes the controller 24, the first camera 12, and the second camera 14. The first and second cameras 12 and 14 each receive a plurality of images of the input object 22, such as a user's hand. The respective images of the input object 22 could be silhouette images that are based on a brightness contrast between the substantially dark input object 22 in the foreground of the bright IR illumination that is diffusely emitted from the top-surface of the light-diffusive screen 20.

The first and second cameras 12 and 14 each input their respective images of a matched pair of images into a digitizer 52. The digitizer 52 produces digitized versions of the images of the input object. The digitized images of the input object 22 are input to an image comparator 54. The image comparator 54 compares each of the digitized images of the input object to a previously stored digitized image of the input object to generate a binarized image of the input object 22. As an example, although the light-diffusive screen 20 emits the IR illumination in a substantially more uniform manner, there may still be illumination intensity gradients across the light-diffusive screen 20. Therefore, the comparison by the image comparator 54 allows for an improved quality of the digitized images despite variations in illumination intensity across the light-diffusive screen 20. As an example, the previously stored digitized image could have been captured during a calibration operation and/or from repeatedly storing the digitized image in memory buffers.

As an example, a background model can be maintained for each of the cameras 12 and 14 without the input object 22 being present. The background model images can be used to decide at each pixel whether the images of the input object 22 correspond to a binary 1 or 0. For example, at each pixel location, if the image of the input object 22 has a value that is approximately greater than the corresponding background model image times a threshold scaling value of between 0 and 1, the output value will be a binary 1, thus denoting the presence of the input object 22. In this manner, the scaling value can be selected to provide an optimal balance between desirably detecting the input object 22 while being substantially insensitive to residual variations in illumination intensity from the top-surface of the light-diffusive screen 20. As a result, edges associated with the input object 22 can be detected in each of the images.

The contrast enhanced binarized silhouette images of the input object 22 are then each input to an object detection algorithm device 56. The object detection algorithm device 56 can be an integrated circuit (IC) or set of ICs within the controller 24, or could be a software routine residing in the controller 24. The object detection algorithm device 56 can include any of a variety of detection algorithms for determining a two-dimensional location of the input object 22 relative to the light-diffusive screen 20. As an example, the object detection algorithm device 56 can include a two-dimensional convolution filter, such as a Laplacian of Gaussian convolution filter, that applies a mathematical algorithm to each of the digitized images of the input object 22 to determine the location of one or more features of the input object 22, such as fingertips, in two-dimensional space, as described in patent application Ser. No. 11/485,788. As another example, the object detection algorithm device 56 can generate a sequence of mid-points that are symmetrically disposed between edges along elongated portions of the input object 22 to form a skeletal representation of the input object 22, as described in patent application Ser. No. 12/133,836. Accordingly, features associated with the input object 22 that can be determinative of input gestures can be detected in each of the silhouette images of the input object 22.

The output data of the object detection algorithm device 56, such as a convolution filtered image or a skeletal representation image, is provided to a calibration data and location resolver 58. The calibration data and location resolver 58 determines a three-dimensional location of the features associated with the input object 22 at a given time. As an example, the calibration data and location resolver 58 can be configured to determine a parallax separation between end-points that are determined, for example, by a peak detector from convolution filtered images provided from each of the cameras 12 and 14. As another example, the calibration data and location resolver 58 can be configured to compare the relative two-dimensional locations of the corresponding points in each of the skeletal representation images of the input object 22 and to interpolate a three-dimensional location of the points based on a parallax separation of the corresponding points. Accordingly, the calibration data and location resolver 58 can determine the three-dimensional location of the one or more features associated with the input object 22 relative to the light-diffusive screen 20 for each matched pair of images provided by the cameras 12 and 14.

The data output from the calibration data and location resolver 58 is input to a gesture recognition device 60. The gesture recognition device 60 interprets the three-dimensional location data associated with the one or more features of the input object and translates changes in the location data into an input gesture. For example, the gesture recognition device 60 could translate two-dimensional motion of the user's fingertip across the light-diffusive screen 20 as a gesture associated with mouse cursor movement. The gesture recognition device 60 could also translate a touch of the light-diffusive screen 20 as a gesture associated with a mouse left-button click. Because the gesture recognition device 60 implements the location data associated with the input object 22, it can be programmed to recognize any of a variety of gestures that utilize one or more fingertips of the user's hand. In this way, the gesture recognition interface system 50 has a much more versatile input capability than touch sensitive screens.

For example, gestures that use multiple fingertips, or even fingertips from both hands, can be interpreted as input gestures that simulate zoom commands, rotate or "twist" commands, or even environment adjustments, such as volume and brightness control, all of which can be programmed for interpretation by the gesture recognition device 60. The gesture recognition device 60 can also be programmed to recognize gestures from multiple users simultaneously. For example, the gesture recognition device 60 can provide multi-point control capability, such that coordinated actions between two hands and/or between multiple users can be implemented. Furthermore, the gesture recognition device 60 can work in conjunction with other computer input devices, such as a conventional mouse or keyboard, to provide additional types of gesture inputs. In addition, the simulated commands may not even require touching the light-diffusive screen 20. For example, a user could simulate a mouse left-click by rapidly moving his or her finger in a downward then upward direction in the space above the light-diffusive screen 20, such that the gesture recognition device 60 evaluates not only changes in the three-dimensional location of the fingertip, but also a time threshold associated with its motion. Moreover, any of a variety of input gestures could be formed from six-degree of freedom motion based on changes in three-dimensional location and orientation of the input object and any associated end-points.

The controller 24 could also include a predefined gesture memory 62 coupled to the gesture recognition device 60. The predefined gesture memory 62 could include a plurality of predefined gestures, with each of the predefined gestures corresponding to a particular device input. For example, the predefined gesture memory 62 could include a database of specific arrangements and combinations of fingertip positions and motions that each correspond to a different computer input. The gesture recognition device 60, upon receiving the three-dimensional location data associated with the one or more features of the input object over a given time, could poll the predefined gesture memory 62 to determine if the gesture input matches a predefined gesture. Upon determining a match, the gesture recognition device 60 could translate the gesture input into the device input that corresponds to the predefined gesture. The predefined gesture memory 62 could be pre-programmed with the appropriate predefined gesture inputs, or it could be dynamically programmable, such that new gestures can be added, along with the corresponding device inputs. For example, a user could activate a "begin gesture sample" operation, perform the new gesture, capture the appropriate images of the new gesture using the first camera 12 and the second camera 14, and input the appropriate device input for which the new gesture corresponds.

It is to be understood that a given gesture recognition interface system is not intended to be limited by the example of FIG. 2. Other implementations are possible for providing inputs in accordance with an aspect of the invention. For example, one or more of the devices in the controller 24 could be integral with other devices, or could be separate from the controller 24. For example, the cameras 12 and 14 could each input their respective images to a common digitizer 52. Accordingly, the gesture recognition interface system 50 can be configured in any of a variety of ways.

Figure 3:
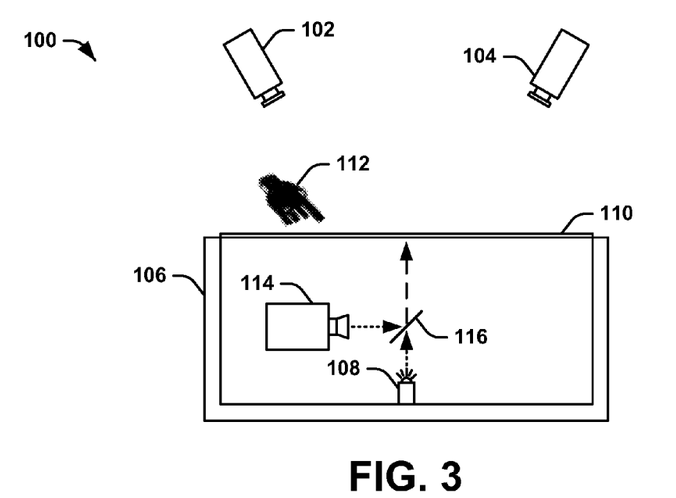
FIG. 3 illustrates another example of a gesture recognition interface system in accordance with an aspect of the invention.

FIG. 3 illustrates another example of a gesture recognition interface system 100 in accordance with an aspect of the invention. Similar to the example of FIG. 1 described above, the gesture recognition interface system 100 includes a first camera 102 and a second camera 104 that may each include an IR filter, as well as a gesture table 106. In the example of FIG. 3, the gesture table 106 includes an IR light source 108 that illuminates an underside of a light-diffusive screen 110. Accordingly, the cameras 102 and 104 are configured to capture silhouette images of an input object 112 that provides gesture inputs above the light-diffusive screen 110, similar to as described above in the example of FIG. 1. The silhouette images can thus be provided to a controller (not shown), such that the gesture inputs can be translated into device inputs.

In the example of FIG. 3, the gesture table 106 also includes a projector 114 configured to project visual content, with which the user can interact via the input object 112, onto the underside of the light-diffusive screen 20. However, in the example of FIG. 3, the projector 114 is configured off-axis from the light-diffusive screen 110 in that it projects the visual content onto a beam-splitter 116. Specifically, the beam-splitter 116 is configured to reflect the visual content onto the underside of the light-diffusive screen 110 and to pass the IR illumination that is provided from the IR light source 108. As a result, the visual content and the IR illumination are combined substantially on-axis by the beam-splitter 116. Accordingly, the IR light source 108 can be substantially centered on the underside of the light-diffusive screen 110, such that the IR illumination is diffusely emitted from the top-surface of the light-diffusive screen 110 in a more evenly distributed manner from a single IR light source.

It is to be understood that the gesture recognition interface system 100 is not intended to be limited to the example of FIG. 3. As an example, the gesture recognition interface system 100 is not limited to using a beam-splitter 116 to provide the on-axis combination of IR light and the visual content.

Therefore, the gesture recognition interface system 100 can be configured in any of a variety of ways.

Figure 4:
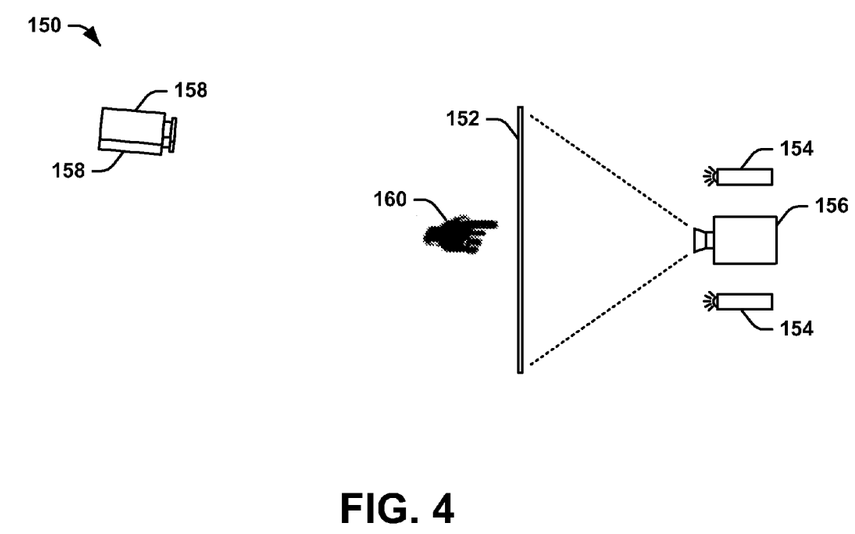
FIG. 4 illustrates another example of a gesture recognition interface system in accordance with an aspect of the invention.

FIG. 4 illustrates another example of a gesture recognition interface system 150 in accordance with an aspect of the invention. The gesture recognition interface system 150 includes a light-diffusive screen 152 that is configured substantially vertical. IR light sources 154 provide IR illumination to a rear-side of the light-diffusive screen 152, and a projector 156 is configured to project visual content onto the rear-side of the light-diffusive screen 152. One or more of the light-diffusive screen 152, the IR light source 154, and the projector 156 can be configured together as a single unit or can be configured separately, such that they can be individually mounted from a ceiling or a floor stand.

A pair of cameras 158, such as including an IR filter, are configured to capture silhouette images of an input object 160 that provides gesture inputs in a foreground of the light-diffusive screen 152, similar to as described above in the example of FIG. 1. The cameras 158 can be mounted on a ceiling or floor stand at any of a variety of angles that are suitable to view the vertical light-diffusive screen 152. The silhouette images can thus be provided to a controller (not shown), such that the gesture inputs can be translated into device inputs.

Because the light-diffusive screen 152 is configured substantially vertical, the gesture recognition interface system 150 may be more suitable for interaction with a larger audience. Specifically, the vertical light-diffusive screen 152 may be more readily viewable by a larger audience than the horizontal light-diffusive screen 20 described above in the example of FIG. 1. As such, the gesture recognition interface system 150 can be implemented for a variety of purposes, such as presentations to a large audience and/or as a virtual dry-erase board in which users provide touch gestures to write and/or draw on the vertical light-diffusive screen 152, as described in patent application Ser. No. 12/133,836.

It is to be understood that the gesture recognition interface system 150 is not intended to be limited to the example of FIG. 4. As an example, the projector 156 can be configured to project the visual content to the front-side of the light-diffusive screen 152, as opposed to the rear-side. In addition, similar to as described above in the example of FIG. 1, the projector 156 could be configured without an IR filter, such that the projector 156 provides both the visual content and the IR illumination to the rear-side of the light-diffusive screen 152. Furthermore, the gesture recognition interface system 150 can implement a beam-splitter to provide substantially on-axis combination of the visual content and the IR illumination onto the rear-side of the vertical light-diffusive screen 152, similar to as described above in the example of FIG. 3. Accordingly, the gesture recognition interface system 150 can be configured in any of a variety of ways.

Figure 5:
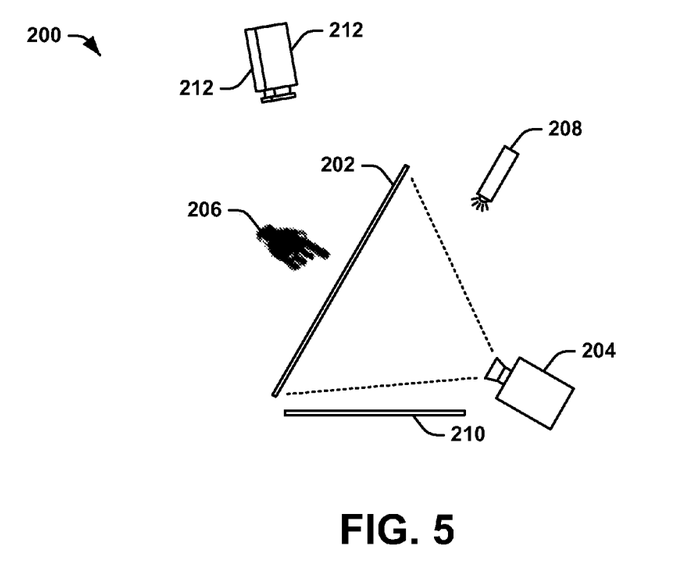
FIG. 5 illustrates another example of a gesture recognition interface system in accordance with an aspect of the invention

FIG. 5 illustrates another example of a gesture recognition interface system 200 in accordance with an aspect of the invention. The gesture recognition interface system 200 includes a substantially translucent screen 202 that can be any of a variety of commercially available display screens. In the example of FIG. 5, the substantially translucent screen 202 is configured at a tilted angle. However, it is to be understood that the substantially translucent screen 202 can be oriented in any of a variety of ways. A projector 204 is configured to project visual content onto the rear-side of the substantially translucent screen 202. The substantially translucent screen 202 can be diffusive of visible light, such that the visual content is observable to from the opposite side of the substantially translucent screen 202 as the projector 204. Accordingly, an input object 206 can provide gesture inputs that are interactive with the visual content in a foreground of the substantially translucent screen 202.

An IR light source 208 provides IR illumination to a Lambertian surface 210. Thus, the IR illumination is reflected from the Lambertian surface 210 in a scattered manner, thus being diffusely reflected to the rear-side of the substantially translucent screen 202. As an example, the Lambertian surface 210 can be configured as a single surface that is oriented to reflect the IR illumination to the rear of the substantially translucent screen 202. As another example, the projector 204 and the IR light source 208 can be arranged in an enclosure that is bound on one side by the substantially translucent screen 202. Thus, one or more of the inner surfaces of the enclosure can be lined with the Lambertian surface 210. Accordingly, the IR illumination can be scattered from one or more of the inner surfaces of the enclosure to be diffusely and substantially uniformly provided at the substantially translucent screen 202. As a result, a pair of cameras 212 can capture silhouette images of the input object 206 based on the brightness contrast between the input object 206 and the IR illumination that is diffusely provided through the substantially translucent screen 202. The silhouette images can thus be translated into device inputs by a controller (not shown), similar to as described above in the example of FIG. 1.

It is to be understood that the gesture recognition interface system 200 is not intended to be limited to the example of FIG. 5. As an example, the projector 204 can be configured to project the visual content to the front-side of the substantially translucent screen 202, as opposed to the rear-side. As another example, the substantially translucent screen 202, and thus the cameras 212, can be oriented in any of a variety of ways for ergonomic and/or viewing purposes. Accordingly, the gesture recognition interface system 200 can be configured in any of a variety of ways.

Figure 6:
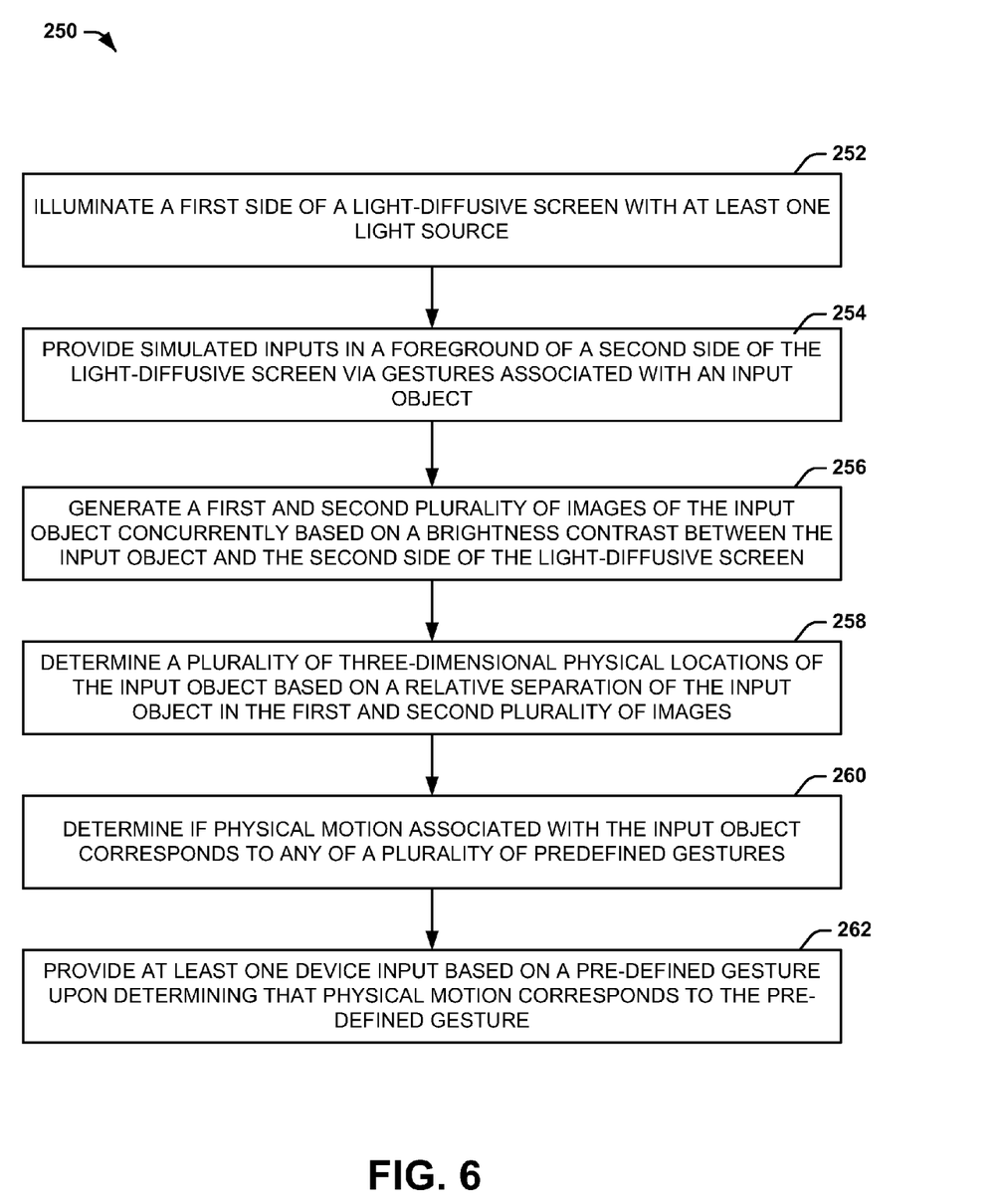
FIG. 6 illustrates an example of a method for providing inputs to a computer in accordance with an aspect of the invention.

In view of the foregoing structural and functional features described above, a methodology in accordance with various aspects of the present invention will be better appreciated with reference to FIG. 6. While, for purposes of simplicity of explanation, the methodologies of FIG. 6 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 6 illustrates an example of a method 250 for providing inputs in accordance with an aspect of the invention. At 252, a first side of a light-diffusive screen is illuminated with at least one light source. The illumination could be provided by IR light sources. The light-diffusive screen could also be an output display, such that it displays visual content. At 254, a user provides simulated inputs in a foreground of a second side of the light-diffusive screen via gestures associated with an input object. The second side can be opposite the first side. The input object could be the user's hand, such that the user simulates the inputs via hand gestures. In addition, the simulated inputs could be simulated mouse inputs, zoom commands, or rotate commands.

At 256, a first and second plurality of images of the input object are generated substantially concurrently based on a brightness contrast between the input object and the second side of the light-diffusive screen. The first and second plurality of images could thus be a plurality of matched pairs of images, such that each image of the matched pair corresponds to the input object from a different perspective at substantially the same time. The light-diffusive screen could appear to be much brighter than the user controlled input object. Therefore, the plurality of images could be silhouette images of the user controlled input object.

At 258, a plurality of three-dimensional physical locations of the input object are determined based on a relative separation of the input object in the first plurality of images relative to the second plurality of images. The relative separation could be a parallax separation of one or more determined points, such as end-points, associated with the input object. The three-dimensional location of the input object could be determined relative to the light-diffusive screen. Changes in location of the three-dimensional location of the input object in each of the plurality of matched pairs of images could be determinative of the physical motion of the input object.

At 260, it is determined whether the physical motion associated with the input object corresponds to any of a plurality of predefined gestures. The predefined gestures could be stored in a memory. Each predefined gesture could be associated with a different device input. At 262, at least one device input is provided based on determining that the physical motion associated with the input object corresponds to a given one of the predefined gestures. Device inputs could be mouse inputs, such that two-dimensional motion across the light-diffusive screen could simulate motion of a mouse cursor, and a touch of the light-diffusive screen could simulate a mouse left-click. In addition, motion associated with multiple features of the input object could provide different types of inputs, such as rotate and zoom commands.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A gesture recognition interface system comprising:
   at least one light source positioned to illuminate a first side of a light-diffusive screen configured to display visual content;
   at least one camera positioned on a second side of the light-diffusive screen, the second side being opposite the first side, and configured to receive a plurality of images performed in a foreground of the second side based on a brightness contrast difference between diffused illumination from the at least one light source via the light-diffusive screen and an input object;
   a projector configured to provide the visual content;
   a beamsplitter configured to combine light emitted from the at least one light source and the visual content substantially on-axis on the first side of the light-diffusive screen; and
   a controller configured to determine a given input gesture that is interactive with the visual content based on changes in relative locations of the input object in the plurality of images, and being further configured to initiate a device input associated with the given input gesture.

2. The interface system of claim 1, wherein the controller is configured to implement an object detection algorithm that is configured to detect a two-dimensional location of at least one feature associated with the input object in each of the plurality of images.

3. The interface system claim 1, wherein the projector is further configured as the at least one light source based on projecting the visual content and substantially unfiltered infrared (IR) light to the first side of the light-diffusive screen.

4. The interface system of claim 1, wherein the light-diffusive screen is configured as a substantially vertical visual content display surface.

5. The interface system of claim 1, wherein the at least one light source is configured to emit infrared (IR) light, and wherein each of the at least one camera comprises an IR filter, such that the plurality of images are configured as silhouette images of the input object relative to diffused IR light emitted from the second side of the light-diffusive screen.

6. The interface system of claim 1, wherein the at least one camera comprises a plurality of cameras that are each configured to substantially concurrently receive a silhouette image of the input object, the silhouette image of the input object received by each of the plurality of cameras comprising a matched set of images of the input object, and wherein the controller determines a three-dimensional physical location of the input object relative to the light-diffusive screen based on an amount of parallax separation of the input object in the matched set of images.

7. The interface system of claim 6, wherein the plurality of cameras comprises a plurality of camera pairs, each of the plurality of camera pairs being configured to concurrently receive images of different respective portions of the light-diffusive screen.

8. The interface system of claim 1, further comprising at least one Lambertian surface configured to diffusely reflect the illumination from the at least one light source to the first side of the light-diffusive screen.

9. A method of providing device inputs, the method comprising:
   illuminating a first side of a light-diffusive screen with at least one light source;
   providing simulated inputs in a foreground of a second side of the light-diffusive screen via gestures associated with an input object, the second side being opposite the first side of the light-diffusive screen;
   generating a first plurality of images and a second plurality of images associated with the input object substantially concurrently via a first camera and a second camera, respectively, based on a brightness contrast between the input object and the second side of the light-diffusive screen;
   determining a plurality of three-dimensional physical locations of the input object based on a relative separation of the input object in the first plurality of images relative to the second plurality of images;
   determining if changes in the plurality of three-dimensional physical locations of the input object correspond to any of a plurality of predefined gestures; and
   providing at least one device input based on a given one of the plurality of predefined gestures upon determining that the changes in the plurality of three-dimensional physical locations of the input object correspond to the given one of the plurality of predefined gestures.

10. The method of claim 9, wherein illuminating the first side of the light-diffusive screen comprises illuminating the first side of the light-diffusive screen with infrared (IR) light, and wherein generating the first and second plurality of images comprises generating a first and second plurality of silhouette images of the input object relative to diffused IR light emitted from the second side of the light-diffusive screen.

11. The method of claim 9, wherein generating the first and second plurality of images associated with the input object comprises generating a matched pair of images associated with the input object, and wherein determining the plurality of three-dimensional physical locations of the input object comprises determining a plurality of three-dimensional physical locations of at least one end-point associated with the input object.

12. The method of claim 9, further comprising displaying visual content on the light-diffusive screen, wherein providing simulated inputs comprises providing the gestures in the foreground of the second side of the light-diffusive screen as interaction with the visual content.

13. The method of claim 12, wherein displaying the visual content comprises projecting the visual content onto the first side of the light-diffusive screen.

14. The method of claim 13, wherein projecting the visual content further comprises concurrently emitting substantially unfiltered infrared (IR) light from a projector to the first side of the light-diffusive screen.

15. The method of claim 13, further comprising substantially combining light emitted from the at least one light source and the visual content substantially on-axis via a beamsplitter.

16. A gesture recognition interface system comprising:
   means for projecting visual content;
   means for displaying the visual content and for substantially diffusing infrared (IR) illumination provided from the means for projecting;
   means for generating a first plurality of silhouette images and a second plurality of silhouette images of the input object relative to the diffused illumination, the first and second plurality of images forming a plurality of matched pairs of silhouette images of the input object;
   means for generating two-dimensional location information associated with at least one feature of the input object for each of the first plurality of images and the second plurality of images;
   means for interpolating three-dimensional location information associated with the input object based on the two-dimensional location information associated with the at least one feature of the input object for each of the plurality of matched pairs of images of the input object;
   means for translating changes in the three-dimensional location information associated with at least one feature of the input object to a given input gesture; and
   means for providing device inputs based on matching the given input gesture with one of a plurality of predefined gestures.

17. The interface system of claim 16, further comprising means for displaying visual content on the means for diffusing, the given input gesture being interactive with the visual content.

* * * * *